United States Patent [19]

Young et al.

[11] Patent Number: 5,653,423
[45] Date of Patent: Aug. 5, 1997

[54] KNIFE GATE VALVE WITH MECHANICALLY RETAINED GATE SEAT

[75] Inventors: Calvin L. Young, Portland, Oreg.; David L. Gambetta, Vancouver, Wash.; Jon A. Hansen; Nolan D. King, both of Portland, Oreg.; Darrel J. DesRochers, Vancouver, Wash.; Richard A. Sutherland, Troutdale, Oreg.

[73] Assignee: Technaflow, Inc., Vancouver, Wash.

[21] Appl. No.: 595,862

[22] Filed: Feb. 6, 1996

[51] Int. Cl.⁶ .................................................. F16K 3/00
[52] U.S. Cl. ........................... 251/328; 251/326; 251/360
[58] Field of Search ................................ 251/328, 309, 251/326, 318, 358, 359, 360; 157/175, 193, 167

[56] References Cited

U.S. PATENT DOCUMENTS

| | | | |
|---|---|---|---|
| 3,223,381 | 12/1965 | Fischer et al. | 251/328 |
| 3,333,816 | 8/1967 | Williams et al. | 251/327 |
| 4,201,365 | 5/1980 | Paptzun et al. | 251/328 |
| 4,494,730 | 1/1985 | George | 251/309 |
| 4,519,583 | 5/1985 | Lapinoja | 251/328 |
| 4,603,864 | 8/1986 | Raftis | 277/12 |
| 4,679,770 | 7/1987 | Liberman | 251/328 |
| 4,703,915 | 11/1987 | King | 251/328 |
| 4,895,181 | 1/1990 | McKavanagh | 251/328 |
| 5,440,127 | 8/1995 | Squyres | 250/341.8 |
| 5,464,035 | 11/1995 | Heinecke | 251/328 |
| 5,549,278 | 8/1996 | Sidler | 251/328 |
| 6,423,122 | 11/1986 | Gambetta | 251/328 |

*Primary Examiner*—Denise L. Ferensic
*Assistant Examiner*—Ramyar M. Farid
*Attorney, Agent, or Firm*—Stoel Rives LLP

[57] ABSTRACT

A knife gate valve comprises a body member to which two aligned conduits are attached. The body member has a U-shaped internal recess of predetermined length formed within it. A removable sealing member fits within the recess and extends along its entire length. The sealing member is comprised of rubber which has been cured about a threaded or irregularly surfaced rod that reinforces the seat, helping to keep it in the correct position and orientation in the recess. The rod protrudes from both lengthwise ends of the rubber and is operatively connected with the body of the valve. This prevents the sealing member from being dislodged by the flow of slurry through the valve or the opening action of the valve in the presence of a sticky slurry.

2 Claims, 6 Drawing Sheets

KNIFE GATE VALVE WITH MECHANICALLY RETAINED GATE SEAT

TECHNICAL FIELD

The present invention relates to knife gate valves, and in particular, in such a valve, to a mechanically retained, resilient seat that contacts the blade portion of the gate as it is lowered to close the valve.

BACKGROUND OF THE INVENTION

Knife gate valves have traditionally been used to control the flow of heavy slurries transported through tubular conduits. The gate has a blade portion with a beveled edge to cut through the material suspended in the slurry as the gate is lowered to seal off the flow through the valve. The gate typically closes against the metal valve body, and the slurry assists in sealing the valve.

A problem associated with using a knife gate to control the flow of slurries of light viscosities is that the material accumulating on the surface of the valve seat does not promote a tight seal. Knife gate valves controlling the flow of light viscosity slurries typically employ, therefore, a sealing member that is made of a resilient substance. This member is squeezed between the gate and the metal valve body when the valve is in the closed position, thereby forming the seat of the valve and sealing the valve. The material accumulating on the sealing member tends, however, to cause the gate to adhere to and pull out the sealing member when the gate is either retracted to open the valve or extended to close the valve. This is especially true for valves that control the flow of nonlubricating fluids. Lubricating the gate contacting surface of the valve sealing member can reduce surface friction and thereby prevent adhesion of the gate to the seat. Lubricating the surface of the sealing member of a knife gate valve precludes, however, its use in conduits that transport substances such as, for example, air and natural gas, which would be contaminated by a lubricating substance. In the transportation of more viscous slurries, moreover, the flow of the slurry when the gate is open may be sufficient to dislodge the sealing member and carry it downstream.

SUMMARY OF THE INVENTION

An object of this invention is to provide in a knife gate valve a resilient seat that is reinforced so that it resists being tugged out of place by the adhesive quality of the slurry as the gate is either being opened or being closed or by the action of the slurry when the gate is open and the slurry is flowing.

Another object of this invention is to provide in such a valve a resilient sealing member that is mechanically retained to the valve so that the sealing member cannot be completely separated from the rest of the valve and carried downstream by the slurry.

The knife gate valve of the present invention comprises a body member to which two aligned conduits are attached. The body member has an opening that defines a passageway between the conduits. The body member also has a U-shaped internal recess of predetermined length, defining a seat cavity, formed within it. The recess communicates with a portion of the opening that defines the passageway. A resilient sealing member attaches to the seat cavity wall and extends along its entire length.

The sealing member is made of a resilient material, such as rubber, and reinforced with a threaded metal rod running lengthwise through the length of the sealing member. The ends of the rod extend outwardly from the ends of the sealing member. Nuts may be screwed onto these rod ends to anchor them firmly onto the gate valve.

Additional objects and advantages of this invention will be apparent from the following detailed description of a preferred embodiment thereof which proceeds with reference to the accompanying drawings.

DETAILED DESCRIPTION OF A PREFERRED EMBODIMENT

Figure 1:
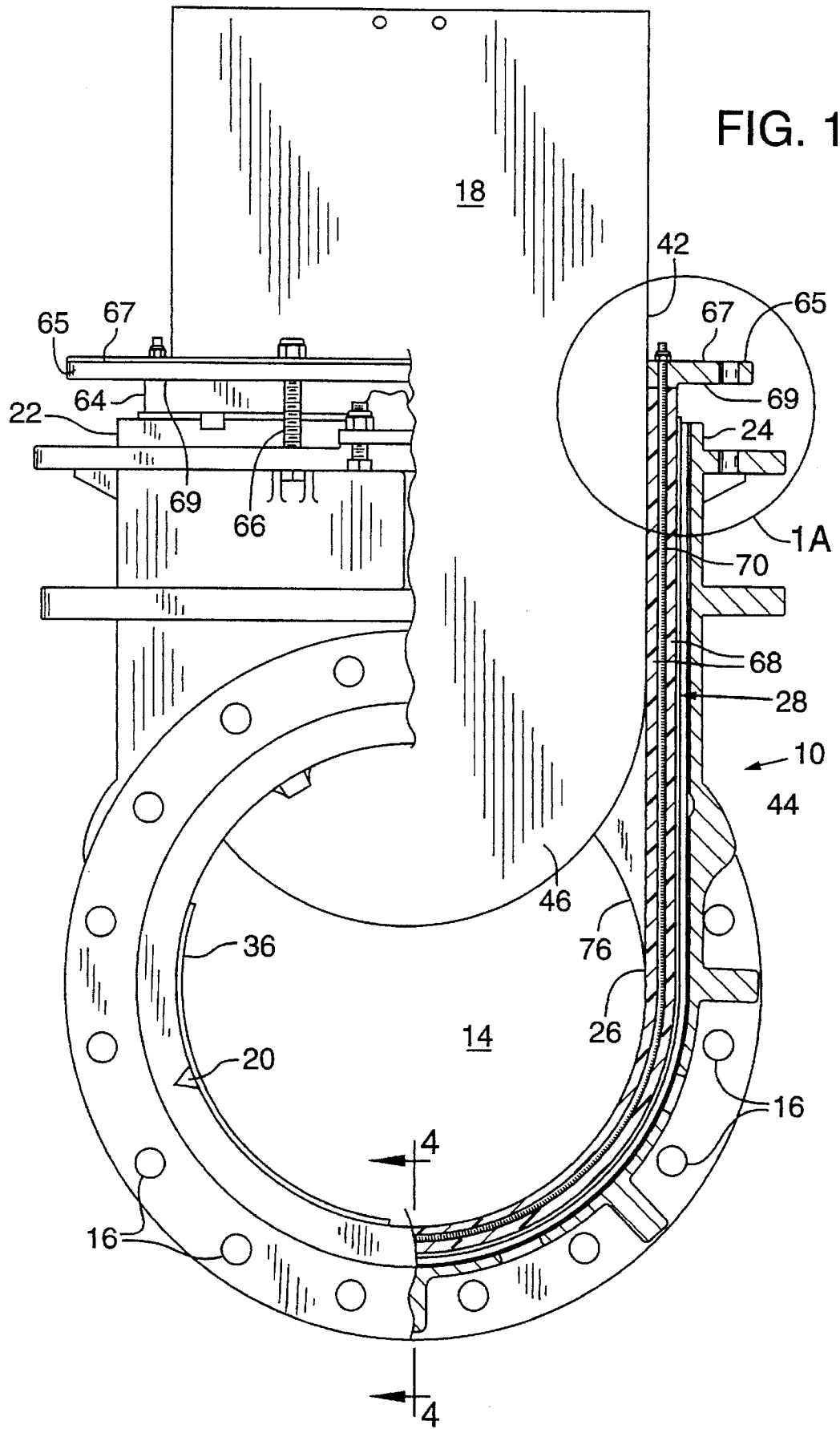
FIG. 1 is a frontal view of the body portion of the gate valve of the present invention which is shown partly in section with the gate in a fully retracted position.
Figure 1A:
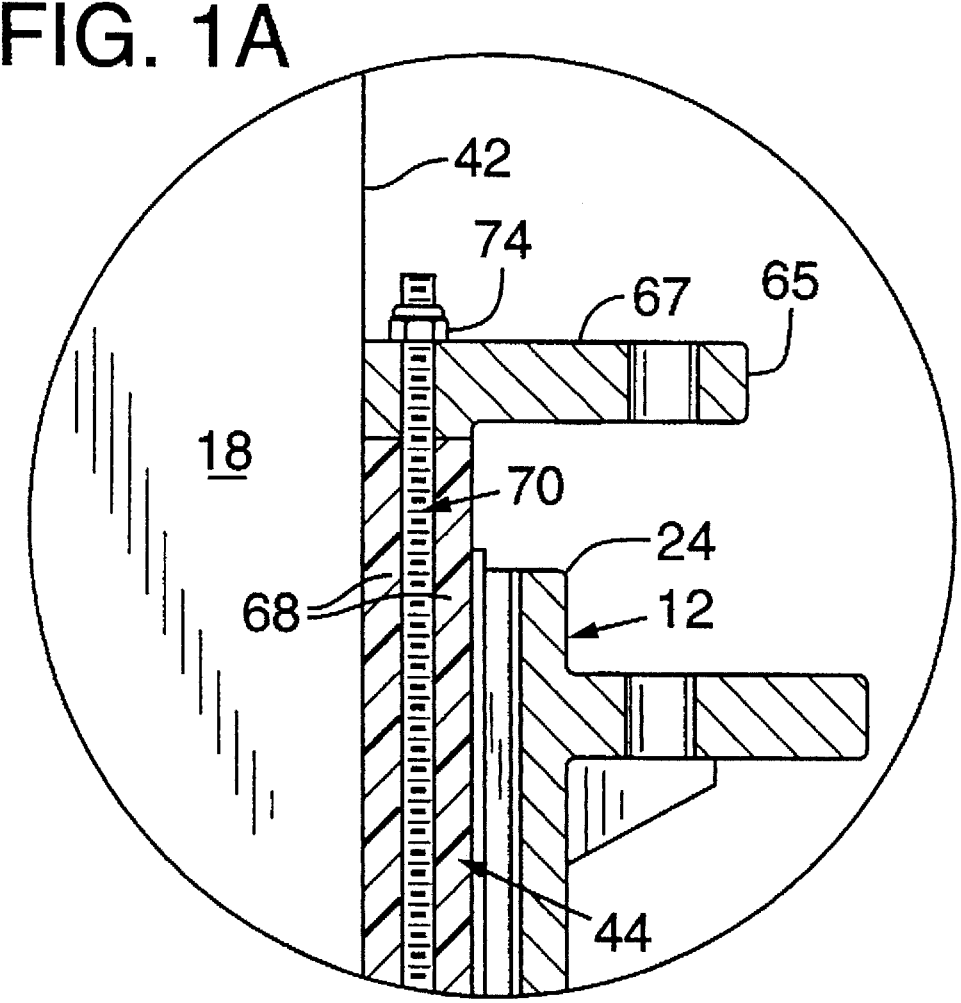
FIG. 1A is an enlarged cross-sectional view of the portion of FIG. 1 included within circle 1A.

With reference to FIGS. 1–4, a knife gate valve 10 comprises a body member 12 that is constructed typically of fabricated steel, cast stainless steel, or a combination of fabricated stainless steel and cast iron. Body member 12 includes a generally circular opening 14 that forms a passageway for fluid to flow through tubular shaped conduits 15 (FIG. 2) that can be attached to valve 10 by passing bolts or other fastening means through bores 16 provided in body member 12.

A gate 18 slides within and generally along the length of the straight portions of an internal U-shaped recess 20 which is formed within body member 12. Recess 20 terminates at left-hand top end 22 and right-hand top end 24 of body member 12 and communicates with opening 14 by extending along approximately two-thirds of its periphery 26.

Recess 20 is of a generally U-shaped cross section and holds a corrosion resistant steel body lining 28 which has a complementary U-shaped portion with a base surface 30 and two adjacent side surfaces 32 and 34. The U-shaped portion of body lining 28 fits within and extends along the length of recess 20. Lining 28 supports the resilient seat of the present invention as will be described below.

A pair of curved guides 36 (see FIG. 4) of generally rectangular cross section is welded to lining 28 on either side of the surfaces that coincide with the top edges of sides 32 and 34 of lining 28 in recess 20. Guides 36 have sides 38 which extend slightly over the open space defined by lining 28 positioned within recess 20. Guides 36 have beveled portions 40 that direct the path of gate 18 as it is lowered along the length of the straight portions of and into recess 20 to close the valve.

Gate 18 has along its side margins a blade portion 42 that slides along and fits within recess 20 formed within body member 12. Gate 18 is dimensioned to lie in a sealing relationship with a sealing member 44 that is described in detail below. Blade portion 42 of gate 18 constitutes a sealing edge which has a curved section 46 that forms a complementary sealing surface for the portion of sealing member 44 that is positioned within the curved section of recess 20.

Figure 2:
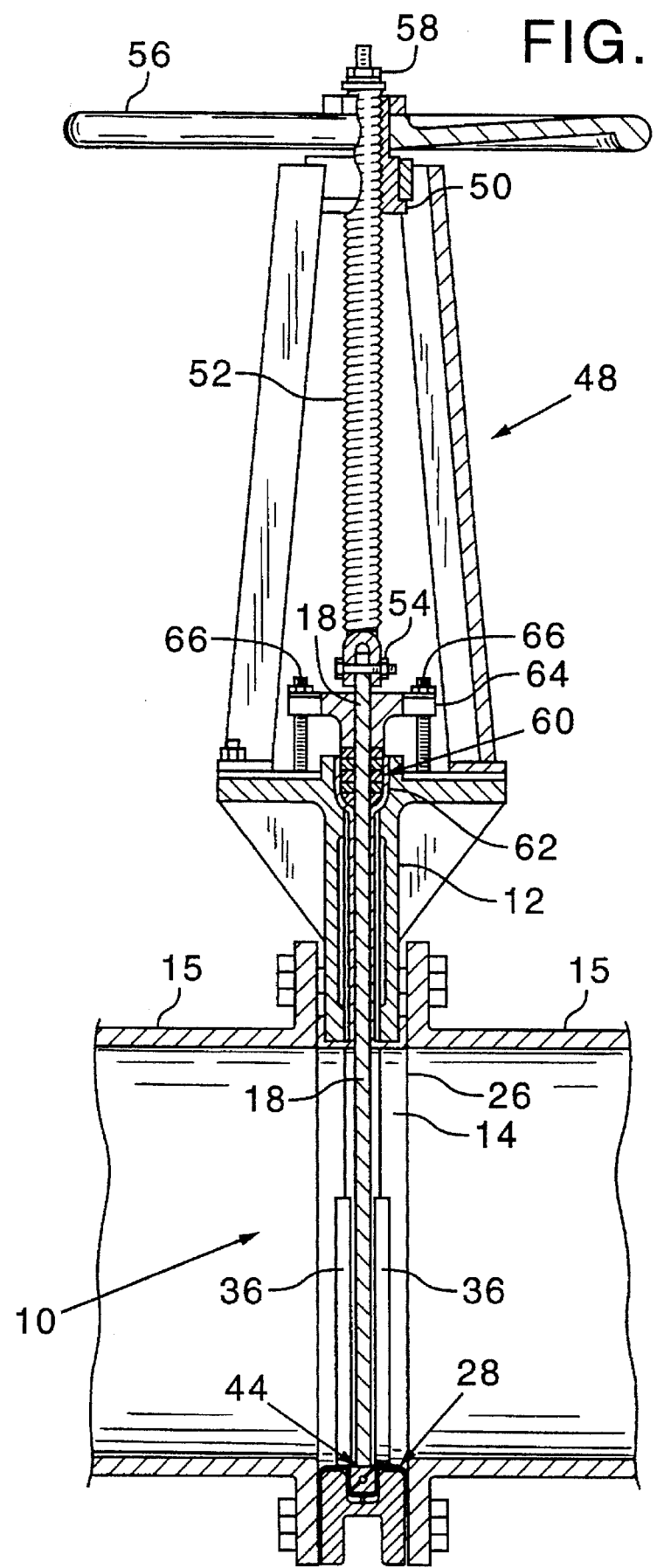
FIG. 2 is a side elevation view of the knife gate valve of the present invention.
Figure 3:
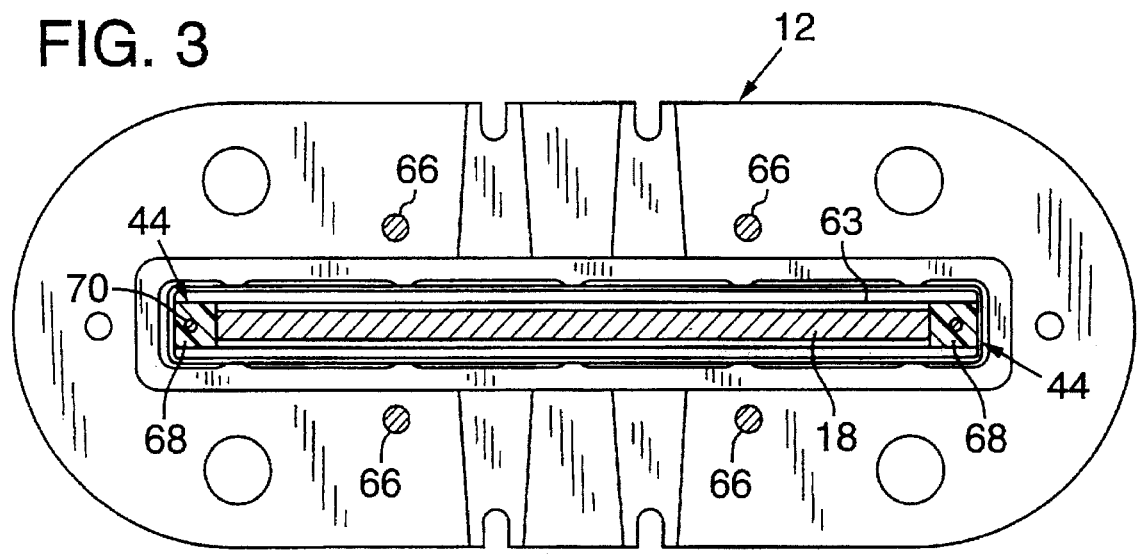
FIG. 3 is a plan view of the body portion of FIG. 1.

With particular reference to FIGS. 2 and 3, yoke assembly or gate actuator 48 is secured to the upper portion of body member 12. Assembly 48 supports a stem nut 50 through which a valve stem 52 is threaded. The lower end of valve stem 52 is secured to the upper end of gate 18 by a pair of bolt assemblies 54 (of which only one is shown in FIG. 2). The upper end of valve stem 52 passes through a threaded bore located in the center of a hand wheel 56. Turning hand wheel 56 in one direction moves gate 18 along the length of the straight portions of and inserts blade portion 42 into recess 20 to close valve 10, and turning hand wheel 56 in the opposite direction moves gate 18 along the length of the straight portions of and retracts blade portion 42 from recess 20 to open valve 10. A stop assembly 58 limits the travel of gate 18 in the direction which closes the valve. Those skilled in the art will recognize that other types of actuators are also possible. For instance, an electric motor or a pneumatic device could be used to move gate 18 between its open and closed positions.

As it moves along the length of recess 20 in body member 12 to open and close valve 10, gate 18 slides through an elongated packing box 60 of generally rectangular cross section which corresponds to that of gate 18. Packing box 60 is loaded with any suitable packing material 62, such as, for example, flax. Gate 18 also slides through an elongated rectangular aperture 63 in a packing gland 64 which fits into the top portion of packing box 60 to retain packing material 62. Packing gland 64 has top flange 65 with an upper surface 67 and a lower surface 69.

Figure 4:
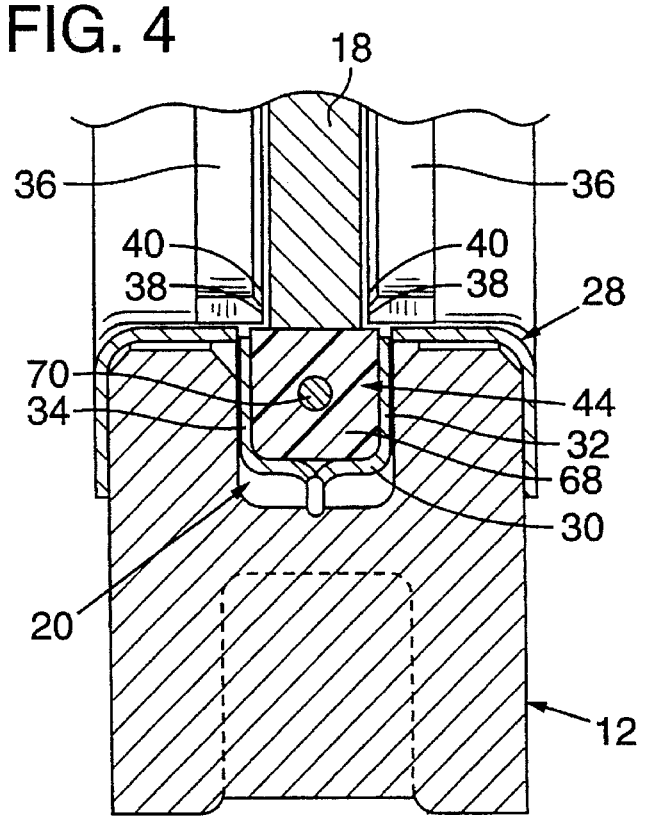
FIG. 4 is an enlarged detail cross-sectional view taken along lines 4—4 of FIG. 1.
Figure 5:
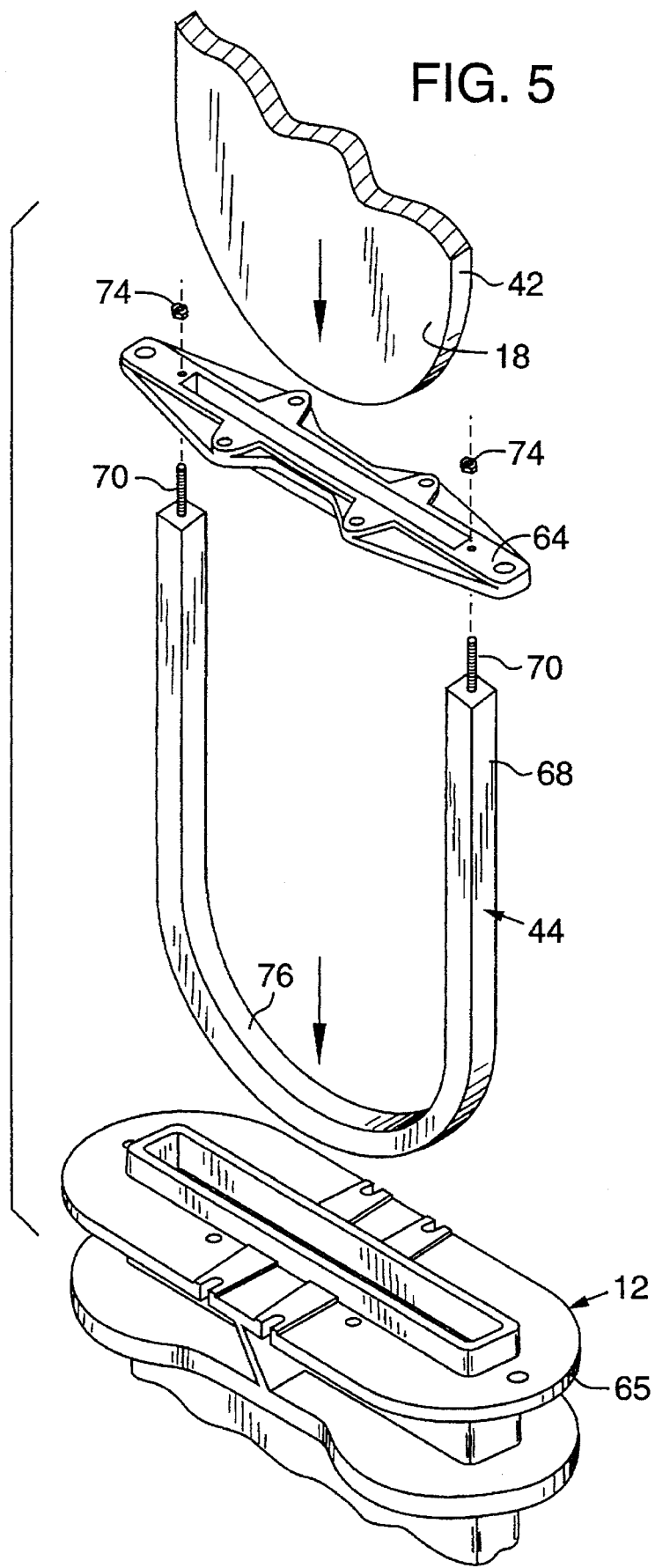
FIG. 5 an exploded isometric view of the sealing member and associated parts of the gate valve of FIG. 1, showing the manner in which the sealing member is installed.
Figure 6:
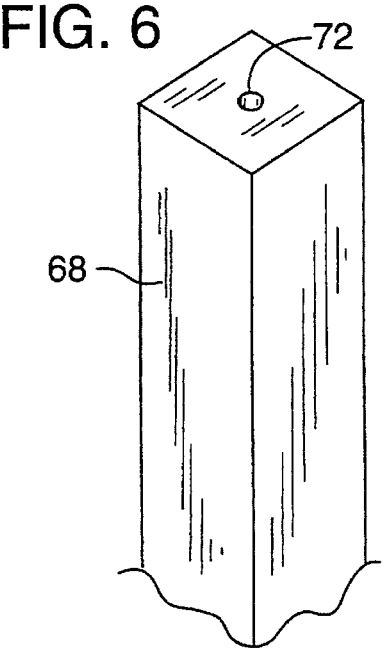
FIG. 6 is an enlarged isometric view of a portion of a length of rubber having a rectangular cross section and a lengthwise aperture used in the production of the gate valve seat of the present invention.
Figure 7:
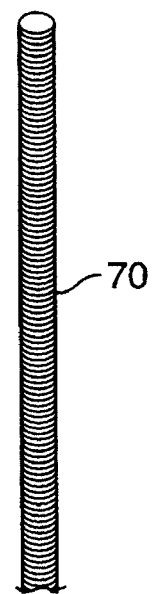
FIG. 7 is an enlarged isometric view of a length of threaded metal rod used in the production of the gate valve seat of the present invention.
Figure 8:
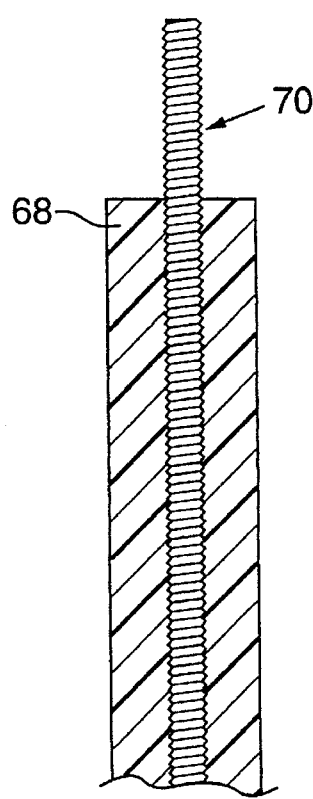
FIG. 8 is a fragmentary cross-sectional side view of the threaded metal rod of FIG. 7 introduced into the lengthwise aperture of FIG. 6.
Figure 9:
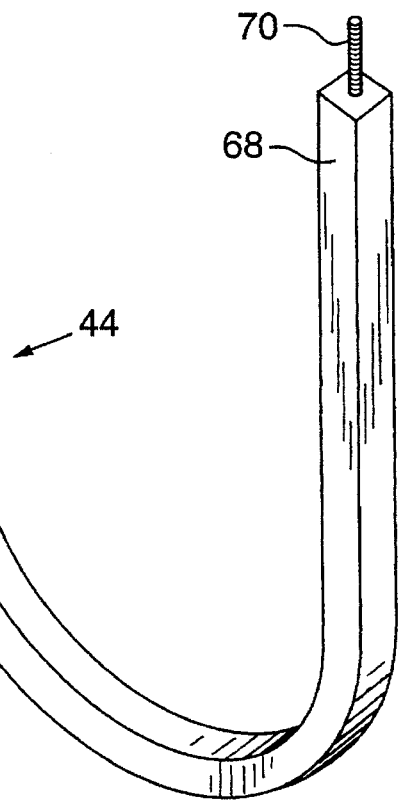
FIG. 9 shows a finished gate valve seat constructed according to the present invention.

With reference to FIGS. 4 and 5, sealing member 44 fits into and extends along the entire length of recess 20 in body member 12. The thickness of member 44 substantially fills the gap defined by metal lining 28 in recess 20 when gate 18 is not in contact with member 44.

Member 44 (See FIGS. 6-9) comprises an elongate rubber portion 68 of approximately rectangular cross section into which a threaded or otherwise irregularly surfaced metal (generally steel) rod 70 has been extended through a lengthwise aperture 72. Rod 70 protrudes from both ends of rubber portion 68. The ends of rubber portion 68 of sealing member 44 rest against the lower surface 67 of top flange 65. Both ends of rod 70 generally extend through holes in the top of packing gland 64 and each end is tightened into place with a nut 74 (FIG. 1).

Packing gland 64 is secured to valve body member 12 with four bolt assemblies 66 (of which only two are shown in FIG. 2). Because rod 70 is firmly attached to gland 64 and gland 64 is bolted to body member 12, member 44 is thereby operatively connected to body member 12 and cannot be dislodged through the flow of material through the gate valve.

Member 44 can be formed into the general U-shape of recess 20 before insertion into body member 12 through rectangular aperture 63. Member 44 can be replaced by removing it from body member 12 also through rectangular aperture 63 while valve 10 remains installed between the conduits.

With reference to FIGS. 1, 2, and 4, member 44 is disposed within and along the entire length of lining 28 in recess 20. Only surface 76 of member 44 contacts the lower edge of blade portion 42 of gate 18. As it moves along and within recess 20, gate 18 slides along surface 76 and pushes member 44 further into recess 20.

It will be appreciated that lining 28 can be eliminated and sealing member 44 can be fitted directly into recess 20 to function in accordance with the invention.

With reference to FIGS. 6-9, member 44 is produced by first providing an extruded length of rubber 68 having a cross section that is substantially a rectangular with aperture 72 in the middle. Then, a slightly longer threaded metal rod 70 is sand-blasted, coated with metal primer and bonding adhesive and allowed to dry. Vulcanizing material is then applied to rod 70 and it is introduced through aperture 72, so that a portion of rod 70 protrudes from either end of rubber 68. Next, rubber 68 is hot vulcanized about rod 70, forming a strong bond between the rod 70 and rubber 68. Vulcanizing material and the vulcanizing process are well known in the art of curing rubber. Persons skilled in that art will be able to choose the process temperature, type of rubber and mixture of vulcanizing material to yield a good bond. This invention is not directed to the details of that process. Finally, element 44 is formed into its final U-shape (see FIG. 9) so that it can fit conformably in the gate valve 10.

Alternatively, a threaded rod may be introduced into an aperture in a length of raw rubber and the entire rod and rubber combination may be forced into a U-shaped mold to be vulcanized and hot molded simultaneously. This process yields a superior rubber-to-metal bonding, but also introduces the additional expense of designing and producing at least one mold.

This invention encompasses an embodiment in which the rod is not operatively connected to the valve body and encompasses another embodiment in which the metal rod is not hot vulcanized inside the rubber.

It will be obvious to those having skill in the art that many changes may be made to the details of the above-described embodiment of this invention without departing from the underlying principles thereof. For instance, a metal rod that is not threaded but has a sufficiently irregular surface to resist the tendency of the rubber to rotate about the rod, thereby breaking the bond to the metal, would work in this application. Irregular, in this instance, is used to mean bumps or pits in the surface of the rod that are roughly of the same scale with respect to the rod as would be screw threads.

In addition, any method of operatively securing the rod to valve body 10 either directly or indirectly is sufficient. The scope of the present invention should, therefore, be determined only by the following claims.

I claim:

1. A gate valve for controlling fluid flow between two aligned conduits, comprising:
    a body member having opposite sides to which the two conduits are attachable, the body member having an opening that defines a passageway between the conduits;
    a gate having a blade portion that fits within an internal recess of a predetermined length formed within the body member, the gate being operable for movement along the length of the recess to occlude the opening in the passageway;

a gate actuator for moving the blade portion of the gate along the length of the recess; and a substantially U-shaped sealing member being substantially rectangular in cross-section and having a length and positioned lengthwise to conformably fit within the recess and thereby form an interface between the gate and the body member, the sealing member comprised of resilient material reinforced with a metal rod being threaded along substantially its entire length and running lengthwise through the entire length of the sealing member and protruding therefrom to reinforce the sealing member.

2. A gate valve for controlling fluid flow between two aligned conduits, comprising:

a body member having opposite sides to which the two conduits are attachable, the body member having an opening that defines a passageway between the conduits;

a gate having a blade portion that fits within an internal recess of a predetermined length formed within the body member, the gate being operable for movement along the length of the recess to occlude the opening in the passageway;

a gate actuator for moving the blade portion of the gate along the length of the recess; and a substantially U-shaped sealing member being substantially rectangular in cross-section and having a length and positioned lengthwise to conformably fit within the recess and thereby form an interface between the gate and the body member, the sealing member comprised of resilient material reinforced with a threaded metal rod running lengthwise through the entire length of the sealing member and protruding therefrom to reinforce sealing member and in which the metal rod has two ends both of which protrude from the resilient material and further in which an operationally stationary portion of the valve has an aperture for each of the two ends and in which each end extends through said aperture and is secured with a nut.

* * * * *